US011093286B2

(12) United States Patent
Potash

(10) Patent No.: US 11,093,286 B2
(45) Date of Patent: Aug. 17, 2021

(54) COMPUTING DEVICE WITH RESOURCE MANAGER AND CIVILWARE TIER

(71) Applicant: Hanan Potash, Austin, TX (US)

(72) Inventor: Hanan Potash, Austin, TX (US)

(*) Notice: Subject to any disclaimer, the term of this patent is extended or adjusted under 35 U.S.C. 154(b) by 248 days.

(21) Appl. No.: 15/139,024

(22) Filed: Apr. 26, 2016

(65) Prior Publication Data
US 2017/0308405 A1 Oct. 26, 2017

(51) Int. Cl.
G06F 9/50 (2006.01)
G06F 9/445 (2018.01)

(52) U.S. Cl.
CPC ........ G06F 9/5011 (2013.01); G06F 9/44505 (2013.01); Y02D 10/00 (2018.01)

(58) Field of Classification Search
CPC .......... G06F 9/50; G06F 9/505; G06F 9/5011; G06F 9/44505; Y02D 10/22
See application file for complete search history.

(56) References Cited

U.S. PATENT DOCUMENTS

| | | | |
|---|---|---|---|
| 5,019,965 A | 5/1991 | Webb | |
| 6,249,793 B1 | 6/2001 | Printezis | |
| 6,604,148 B1 | 8/2003 | Dennison | |
| 6,782,468 B1 * | 8/2004 | Nakazato | G06F 9/30036 709/213 |
| 7,502,859 B2 | 3/2009 | Inoue et al. | |
| 7,627,739 B2 | 12/2009 | Farren et al. | |
| 7,685,409 B2 | 3/2010 | Du | |
| 8,261,281 B2 | 4/2012 | Kashyap | |
| 8,190,807 B2 * | 5/2012 | Reid | G06F 11/3636 711/3 |
| 8,453,126 B1 | 5/2013 | Ganelin | |
| 8,549,173 B1 * | 10/2013 | Wu | G06F 9/5016 370/235.1 |
| 8,671,418 B2 | 11/2014 | Barsness et al. | |
| 8,990,308 B2 | 3/2015 | Wiig et al. | |
| 9,135,079 B2 | 9/2015 | Flemming et al. | |
| 9,977,693 B2 | 5/2018 | Potash | |
| 10,061,511 B2 | 8/2018 | Potash | |
| 10,067,878 B2 | 9/2018 | Potash | |
| 10,095,641 B2 | 10/2018 | Potash | |

(Continued)

OTHER PUBLICATIONS

U.S. Appl. No. 62/233,964 (Year: 2004).*

(Continued)

Primary Examiner — Theodore C Parsons
Assistant Examiner — Bruce S Ashley
(74) Attorney, Agent, or Firm — Fish & Richardson P.C.

(57) ABSTRACT

A computing device includes one or more processors and one or more memory devices. The computing device comprises a Civilware tier configured to perform one or more resource management functions in the computing device. In some embodiments, the Civilware tier includes a resource manager that is at least partially programmable to manage one or more functions in the computing device. The Civilware tier may enforce one or more rules of behavior in the computing device. In some embodiments, the computing device further includes an instructions interpretation tier. The rules enforced by the Civilware tier are independent of the specifics of the algorithms executed in the instruction interpretation tier (e.g., the Civilware tier is orthogonal to the instruction interpretation tier).

23 Claims, 5 Drawing Sheets

(56) References Cited

U.S. PATENT DOCUMENTS

| | | |
|---|---|---|
| 10,140,122 B2 | 11/2018 | Potash |
| 10,810,010 B2 | 10/2020 | Potash |
| 2001/0049276 A1* | 12/2001 | Beck .................... G06F 13/385 |
| | | 455/414.1 |
| 2001/0049726 A1 | 12/2001 | Comeau |
| 2004/0024791 A1 | 2/2004 | Martin |
| 2005/0188055 A1 | 8/2005 | Saletore |
| 2006/0015263 A1 | 1/2006 | Stupp |
| 2006/0074876 A1* | 4/2006 | Kakivaya .......... H04L 29/12132 |
| 2006/0212847 A1 | 9/2006 | Tarditi |
| 2007/0198979 A1 | 8/2007 | Dice |
| 2008/0008188 A1 | 1/2008 | Buga et al. |
| 2008/0215790 A1 | 9/2008 | Coteus et al. |
| 2010/0005214 A1 | 1/2010 | Trombley et al. |
| 2011/0219208 A1 | 9/2011 | Assad |
| 2011/0320637 A1 | 12/2011 | Coneski |
| 2012/0221755 A1 | 8/2012 | Schultz |
| 2015/0006852 A1 | 1/2015 | Gschwind |
| 2015/0278110 A1 | 10/2015 | Gschwind |
| 2015/0286500 A1 | 10/2015 | Desai et al. |
| 2015/0363318 A1 | 12/2015 | Redford |
| 2015/0378747 A1 | 12/2015 | Mudusuru et al. |
| 2016/0078342 A1 | 3/2016 | Tang |
| 2016/0277311 A1* | 9/2016 | Challa .................... G06F 9/5077 |
| 2017/0083237 A1 | 3/2017 | Potash |
| 2017/0083238 A1 | 3/2017 | Potash |
| 2017/0083434 A1 | 3/2017 | Potash |
| 2017/0083449 A1 | 3/2017 | Potash |
| 2017/0083464 A1 | 3/2017 | Potash |
| 2017/0093867 A1* | 3/2017 | Burns .................... H04L 63/108 |
| 2017/0286302 A1* | 10/2017 | Roy .................... G06F 12/0831 |
| 2019/0179634 A1 | 6/2019 | Potash |

OTHER PUBLICATIONS

International Search Report and Written Opinion, PCT/US17/029461 dated Aug. 29, 2017.
Notice of Allowance dated Jul. 11, 2017 in U.S. Appl. No. 14/863,022.
Notice of Allowance dated Jul. 28, 2017 in U.S. Appl. No. 14/863,041.
Office Action dated Oct. 18, 2017 in U.S. Appl. No. 14/863,032.
Final Office Action dated Oct. 18, 2017 in U.S. Appl. No. 14/863,052.
International Search Report and Written Opinion, PCT/US16/53486 dated Jan. 26, 2017.
Office Action dated Mar. 24, 2017 in U.S. Appl. No. 14/863,022.
Office Action dated Mar. 10, 2017 in U.S. Appl. No. 14/863,041.
Office Action dated Jun. 19, 2017 in U.S. Appl. No. 14/863,047.
Office Action dated Mar. 10, 2017 in U.S. Appl. No. 14/863,052.
Notice of Allowance dated Feb. 12, 2018 in U.S. Appl. No. 14/863,047.
Office Action dated Mar. 9, 2018 in U.S. Appl. No. 14/863,052.
Notice of Allowance dated May 1, 2018 in U.S. Appl. No. 14/863,022.
Notice of Allowance dated May 17, 2018 in U.S. Appl. No. 14/863,041.
Notice of Allowance dated Jun. 6, 2018 in U.S. Appl. No. 14/863,032.

* cited by examiner

*3 Dimensioned Variable Format*

| VMF Size (10) | Var. Type (6) | Variable ID(8) | Dimensions (4) | Mutable (2) | Bin Location (16) | Bin size (12) |
|---|---|---|---|---|---|---|
| Variable Memory address (32) | | | Variable size (32) | | | |
| Dimension 1 Base (2) | Size (30) | | Dimension 2 Base (2) | | Size (30) | |
| | | * | | | | |
| | | * | | | | |
| | | Dimension N Base (2) | | | Size (30) | |
| Ancestor ID | | | | | | |

FIG. 3

*Single operand Variables and constants format*

| VMF Size (10) | "0" | # of Variable (8) | Var. ID (8) | Var. Type (6) | Bin Location (16) | Bin size (12) |
|---|---|---|---|---|---|---|
| Variables Block Memory Address (32) | | | | Var. ID (8) | Var. Type (6) | |
| # of constants (8) | Var. ID (8) | Var. Type (6) | Var. ID (8) | Var. Type (6) | Constants base (12) | |
| Ancestor ID | | | | | | |

FIG. 4

*Program Type Variable Descriptor*

| VMF size(10) | Type (6) | Variable ID(8) | Dimensions (4) | Mutable (2) | Bin Location (16) | Bin size (12) |
|---|---|---|---|---|---|---|
| Variable Memory address (32) | | | | Variable size (32) | | |
| Authorizer ID | | | | | | |
| Ancestor ID | | | | | | |
| Descendent Variable List | | | | | | |

*FIG. 5*

COMPUTING DEVICE WITH RESOURCE MANAGER AND CIVILWARE TIER

BACKGROUND

Field

The present invention relates to the field of computer processors and methods of computing. More specifically, embodiments herein relate to computer processors with architectures including mechanisms for managing resources and implementing rules of civility (implementations of which are described below as "Civilware").

Background

Today's processor core or other large IC design projects generally involve many contributors, working in collaboration through complex processes. In a large company, different groups may be responsible for various different aspects of the design: for example, one for arithmetic functional unit design, another for cache designs, another for memory and I/O interface, another for the instruction interpretation section, etc. A major task is the integration and assembling of these contributions into a completed device.

In the architecture of many computing devices, the aspects of the processor that execute instructions according to a pre-defined algorithm may be well established. These computing devices may however, lack mechanisms for dealing with variations in the underlying purposes of a given device (e.g., rules that apply to a particular application), as well as administrative or logistic concerns such as security (e.g., vulnerability to malware), privacy, and management and implementation of parallel processing.

In a computing context, laws without the appropriate "law enforcement" capabilities may be a significant weakness in computing systems today. Computing systems may, for example, provide insufficient or a total lack of built-in tools for cooperation (parallelism), security, and privacy. The lack of rules-enforcement mechanisms in register architecture-based systems, for example, may be factor in the lack of compelling programming paradigms for general parallel systems and dearth of hardware paradigms for enhanced security. As used in this document, the term "paradigm" may be viewed in the context of the following reference.

US National Academy of Sciences (NAOS) 2011 report *The Future of Computing—Game Over or Next Level:*
"The only foreseeable way to continue advancing performance is to match parallel hardware with parallel software and ensure that the new software is portable across generations of parallel hardware . . . . Using higher-level abstractions, programming languages, and systems that require more computing power but reduce development time and improve software quality by making the development of correct programs and the integration of components easier . . . . There is no known alternative to parallel systems for sustaining growth in computing performance; however, no compelling programming paradigms for general parallel systems have yet emerged . . . "

In a classic Von Neumann architecture, both "program" and "data" may be in the same memory space. This characteristic allows programs to "procreate", i.e. the computer becomes the tool for generating new programs. While the ability for programs to effectively "procreate" is important to software generation, it is also the basic mechanism for breaching security through the network. The typical malware activation method starts with sending the target machine an innocuous looking data item. Then, because the target machine does not know that the malware is a program that is cloaked as this data item, the target machine becomes the host that turns the "data" into an active program, which may be used, for example, to penetrate the infected machine and steal its data, or to recruit the machine into a botnet that is used in denial of service attacks.

In some environments, an effective means of enforcing security and privacy rules is a supervised "program build" process. Medical institutions, banks, retail, government systems, for example, may be successful to protect themselves from malware by using only "certified" programs and processes, with the "procreation feature" turned off. However, this approach may often not be taken today because of:

1) Today's architectures may not have the capacity to restrict "procreation" to a controlled "program build" process without unduly restricting the general applicability of computer systems.
2) Presently the ability to "procreate" programs is so important in general practice that it must be included in systems for "all," (all clients, all users, the whole world basically) and
3) Due to lack of computer architecture options in the marketplace, today's standards are providing systems that work equally poorly for "all".

Some types of errors in a processor may be extremely difficult to identify, both during the development process and in production. Errors may go unnoticed and turn into a damaging system bug. Moreover, existing tools may require very long debug times.

SUMMARY

Embodiments herein relate to the nature of a Civilware Tier of computer processors with architecture that includes mechanisms for orthogonally separating the tactical tasks from the logistic and administrative tasks, and for providing an environment for definition and enforcement of the rules and responsibilities of task behavior.

In this context tactical generally denotes the execution of application programs in a logical context (logical context refers to the environment of the source or High Level Language ("HLL") language, where variables, operators, complex structures, and algorithms are directly interpreted per the fields of mathematics and logic, as opposed to how they will be physically implemented on a computer), logistic refers to the mapping of logical needs to physical spaces and devices, and administrative refers to procedures and rules of interactions among the elements of the computing device or computing system. The Civilware Tier is the collection of software and hardware elements responsible for the logistic and administrative functions in computing devices and systems.

Embodiments of the present invention relate to the field of computer processors and methods of computing. The fundamental new strategic architecture direction of computing devices described herein are outlined in U.S. patent application Ser. No. 14/863,022, "COMPUTING DEVICE WITH FRAMES/BINS STRUCTURE, MENTOR LAYER AND PLURAL OPERAND PROCESSING," by Potash, filed Sep. 23, 2015 (the "'022 Application"), which is incorporated by reference as if fully set forth herein.

The '022 strategic direction that may include a civilware tier is based on replacing the Registers construct in current Register machines instruction sets with Variables constructs that match the basic conceptual units of software and provides methods for forming non-blocking information flow in the data structure. This new strategic direction in both processor design and in High Level Languages inclusion of parallel processing semantics is aimed to develop means of overcoming the "ILP Wall" ("ILP" being an acronym for "Instruction Level Parallelism") enabling higher performing computer processors, ease of code portability, enable the inclusion of communications as a basic Variable of the computing device, afford significant advantages in security, privacy, software robustness, and debug, and support micro- and macro-parallelism where macro-parallelism is also referred to as processors cooperation or threads cooperation.

Implementation approaches presented here (see, e.g., FIG. 2) are based on a dual Control Tier structure containing a top Control Tier as the Instruction Interpretation Control Tier that is responsible for the tactical operations and the Civilware Tier that is responsible for controlling the logistic and administrative portion of the operations.

The orthogonal separation of the tactical information from Civilware information directly relates to several key issues: (1) increasing the portability of machine language codes, both among different implementations of this architecture, and from other architectures to this architecture, (2) maximizing the internal parallelism of the computing device by enabling the Civilware Tier to run mostly in parallel with the algorithmic application code, (3) the construction and implementation of effective parallel programming paradigms, (4) incorporating communication links as basic element of the computing processor model, and (5) providing means for supporting security, privacy, software robustness and debug support.

The approach described herein, in various embodiments, separates the algorithmic (tactical) machine language code, which is produced by the compiler from the source HLL application code, from the information produced by the compiler, assembler and OS that is used by the Civilware Tier to perform its tasks regarding administrative procedures and the assignment and use of resources. The orthogonal separation of information allows the hardware and software for the Civilware Tier to be constructed such that it is invisible to the algorithmic machine language, and with the result that two different computing device implementations may use the same algorithmic machine language code to run an application. The method also simplifies the porting of Civilware, as parameters (memory size, number of physical Mentors see '22, etc.) may change, all the Civilware code is in one place rather than consists of items distributed throughout the system.

The orthogonal separation of codes enables the Civilware Tier to run its tasks mostly in parallel with the running of algorithmic code in the Instruction Interpretation Tier. Tasks done by the Civilware Tier may include but are not limited to the following: resource allocation and management of; Mentor, Bin, virtual memory, physical memory; management of resources for micro- and macro-parallelism, I/O and communications, security tasks, and debug support.

As indicated by the US National Academy of Sciences (NAOS) 2011 report *The Future of Computing—Game Over or Next Level*: a vexing computer architecture issue is the lack of paradigms applicable to micro- and macro-parallelism; "There is no known alternative to parallel systems for sustaining growth in computing performance; however, no compelling programming paradigms for general parallel systems have yet emerged . . . " It is our contention that providing an environment where logistic and administrative issues regarding parallelism may be addressed independently of the specifics of particular application algorithms is a significant component for parallel paradigm development.

Civilware Tier Functions/Responsibilities

The tasks performed by computing device may be classified as two orthogonal sets;

the tactical tasks which are directly requested by the execution of application program algorithms (.exe, ADD, CALL, Search, etc.) and the logistics and administrative tasks, elements and procedures that;

deploy physical resources (assign physical memory space to logical "virtual" pages, assign Bin cache space to operands, etc.) and manage the correct and secure operation of the various elements of the computing device (assure that array address computation does not reach outside array bounds, assures proper recovery from a branch miss-prediction, etc.).

The Civilware Tier may include the collection of software and hardware elements responsible for the logistic and administrative functions in computing devices and systems.

The functions of the Civilware Tier may include but are not limited to the following:

The Civilware Tier may be responsible for the mapping of logical spaces and logical entities to physical spaces and physical entities, and may be responsible for the assignment of physical entities to specific tasks. Logical spaces and entities may be mapped directly to physical spaces and entities or indirectly through other logical spaces and entities. Logical spaces and entities are also referred to as "virtual" spaces or entities for example "virtual memory", "virtual threads", "virtual I/O links". The logical spaces and entities are also referred to by names such as "thread", "interpreter", and "cloud". The Civilware Tier may be responsible for providing means for supporting security, privacy, debugging support and enhancing software robustness. Examples of those means are encryption, malware scans, enforcing bounds checks on all memory references, reporting of addressing rule violations, and the process of securely promoting a data file into an executable program file.

The Civilware Tier may be responsible for providing means of cooperation, such as communicating through the Internet's TCP/IP protocol, supporting development of and implementing cooperation paradigms among logical entities (threads, programs, routines, etc.), supporting development of and implementing cooperation paradigms among physical entities (processors, memories, communications links, etc.), and supporting development of and implementing cooperation for combinations of physical and logical entities. An example is the new paradigm of OSI-RM Virtual Links described in this document. OSI-RM Virtual Links reduces the effective protocol overhead per transaction associated with communications between routines in concurrently operating processes.

While it is a basic desire to have both the tactical application codes and Civilware code portable it is our current understanding that new Civilware parallel processing paradigms may require specific hardware means such as a shared memories or Mentors capable of supporting OSI-RM Virtual links.

The Civilware Tier may contain a set of algorithms and data tables, in its own memory structure or segment called "Civilware storage". Civilware defines and enforces rules of behavior for programs, data Variables, program Variables, processors communications, I/O, and instrumentations links. In supporting the logistics and administrative tasks, the Civilware algorithms may be independent of the specific application algorithms. The Civilware Tier may be responsible for enforcing program behavior rules (Civilware rules), executing the consequences of violations, and collecting the statistics regarding rule violation patterns.

The Civilware memory may vary in whether or not it can be programmed, in whole or in part, and under what circumstances, depending on different embodiments, versions, or models of the architecture. Different physical and logical encapsulation of Civilware memory may be called for different embodiments, versions, and models while still providing a compatible spectrum of functionality for all of them. The architecture may provide a wide range of security options to satisfy needs of many computer industry segments, while still achieving commodity high volume of today's computer industry. In some configurations the Civilware memory, as a whole or in part, may not be re-programmable under any operating conditions, and thus the system may be configured to be practically impenetrable by "hackers" without physical modification by certified support personnel, or anyone else. Alternatively, for other configurations, the Civilware memory may be programmable by machine code instructions. Many security options within this spectrum may be provided.

Computing devices may, in various embodiments, include a processor (e.g., CPU) and computer memory. In an embodiment, a computing device includes one or more processors and one or more memory devices. The computing device comprises a Civilware tier configured to perform one or more resource management functions in the computing device. The Civilware tier may enforce one or more rules of behavior in the computing device. In some embodiments, the Civilware tier includes a resource manager that is at least partially programmable to manage one or more functions in the computing device.

In some embodiments, the computing device further includes an instructions interpretation tier. The rules enforced by the Civilware tier may be independent of the specifics of the algorithms executed in the instruction interpretation tier (e.g., the Civilware tier is orthogonal to the instruction interpretation tier). The Civilware tier enforces the logistics processes and computes the Civilware rules mostly independently and in parallel with the conventional (tactical) instruction interpretation algorithmic process.

In some embodiments, the Civilware tier of a computing device includes "hermetically sealed" portions. "Hermetically sealing" is a term coined within this document to mean methods that prevent or inhibit changes in the programming in all or a portion of the Civilware tier.

BRIEF DESCRIPTION OF THE DRAWINGS

FIG. 3 illustrates a virtual mentor file (VMF) format for dimensioned element (array).

FIG. 4 illustrates a virtual mentor file (VMF) for mentor holding single variables and constants.

FIG. 5 illustrates a virtual mentor file (VMF) including the "program" type and the credential ID of the authorizer.

Figure 1:
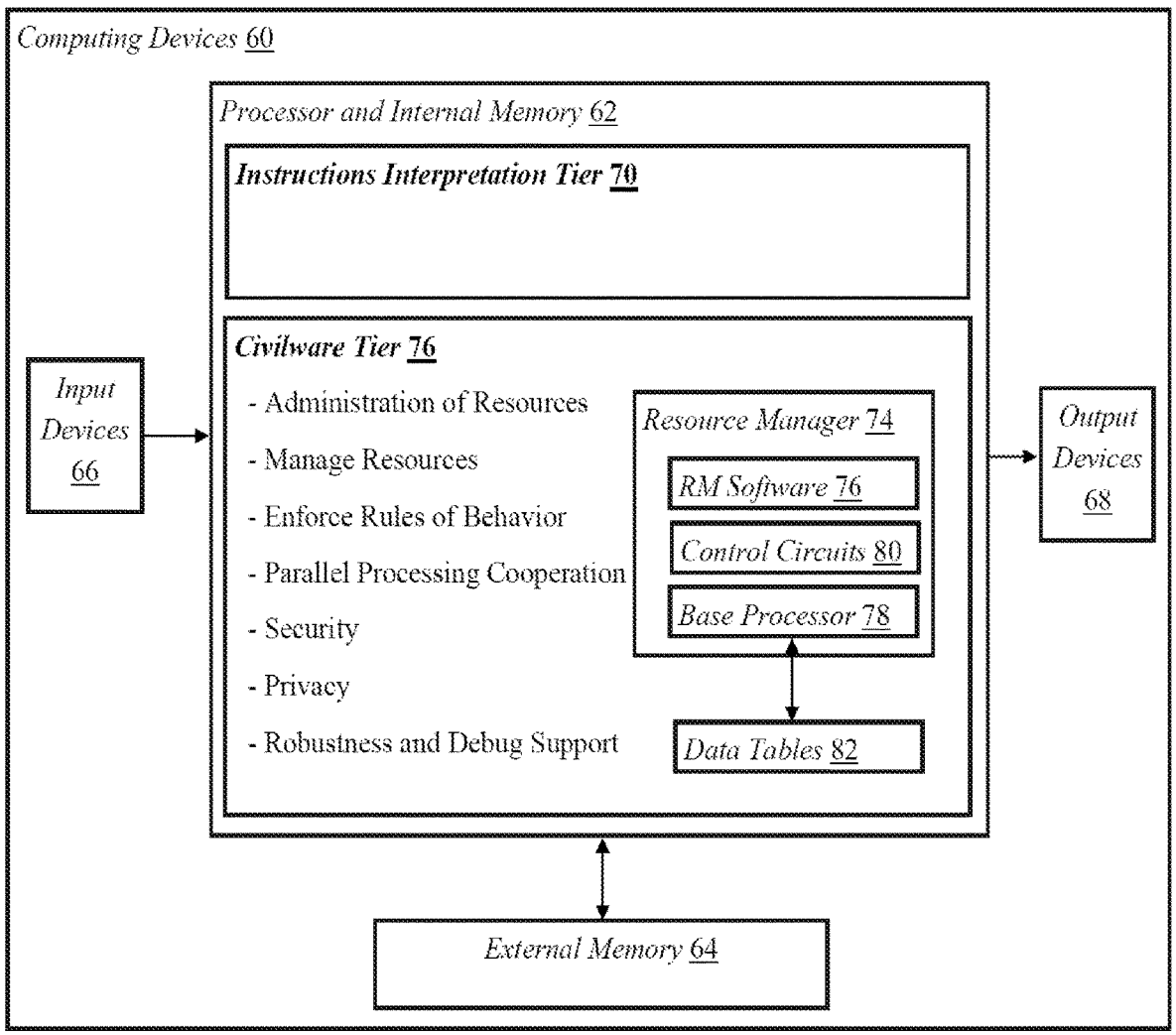
FIG. 1 illustrates one embodiment of a computing device implementing a Civilware tier.

While the invention is described herein by way of example for several embodiments and illustrative drawings, those skilled in the art will recognize that the invention is not limited to the embodiments or drawings described. The emphasis in the examples is to show scope of the architecture, not to present preferred implementation(s). It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In various embodiments, a computing device includes a Civilware tier that performs resource management functions in the computing device. The Civilware tier may be orthogonal to an algorithmic instruction interpretation tier. Register Architectures are, it is contended, absent of: (1) the "Variables" constructs, which are the hardware's means of recognizing and handling software's basic entities and (2) Civilware rules enforcement mechanisms. The absence of the two, it is further contended, forms the main reasons for the reported lack of development in the area of "compelling programming paradigms for general parallel systems" as stated in *The Future of Computing—Game Over or Next Level.*

In some embodiments, the Civilware tier includes a resource manager. The resource manager may allocate shared resources and be responsible for enforcement of the Civilware rules. The resource manager may have a base processor and one or more control circuits. Some portions of the resource manager may be programmable. Some or all portions of the resource manager may be hermetically sealed, inhibiting changes to functionality.

In some embodiments, architecture for a computing device is based on a dual programmable tier approach to the design of a general purpose processor. The top tier is an instruction interpretation control tier, a section responsible for managing the processor's operation according to the algorithm prescribed by the program. A second tier, which may be referred to herein as a "Civilware tier", may be responsible for all resource management logistic and administrative functions.

As noted above, the Civilware tier may be "orthogonal" to the algorithmic "instruction interpretation" tier. The rules enforced in the Civilware tier may apply to all Variables and programs and are independent of the specifics of particular applications algorithms.

In certain embodiments, a Civilware and resource management programmable tier may be implemented as an integral part of a general purpose processor (GPP) architecture. The tier may operate mostly in parallel with the instructions interpretation tier.

FIG. 1 illustrates one embodiment of a computing device implementing a Civilware tier. Computing device 60 includes processor and internal memory 62, external memory 64, input devices 66, and output devices 68. Processor and internal memory 62 implements dual tiers, including instruction interpretation tier 70 and Civilware tier 72. Civilware tier includes resource manager 74. Resource manager 74 includes resource management software 76, base processor 78, and control circuits 80. Control circuits 80 may be hardwired. Base processor 78 may access data tables 82 to perform various resource management functions.

Figure 2:
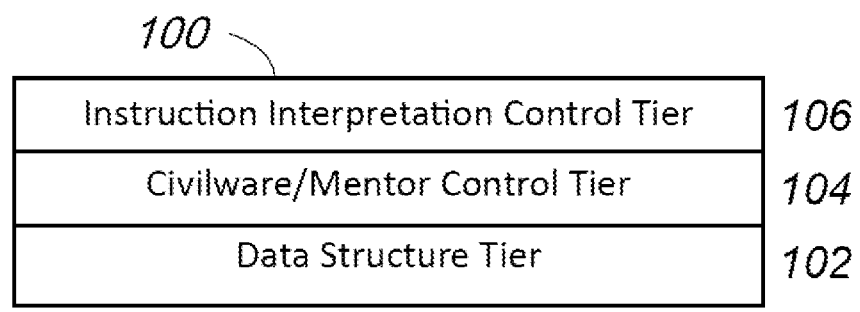
FIG. 2 illustrates one embodiment of computing device implementing a mentor layer.

In some implementations of the design, the Civilware tier is enabled by the definition of Variables and a mentor/bin framework as further described herein. Some of the devices described in the '022 Application reference both "instruction interpretation" and "logistic" control tiers. The Resource Manager described herein may be implemented as part of the logistic control tier of the devices described in the '022 Application. FIG. 2 is a diagram illustrating one embodiment of a processor including a three-layer-architecture. Processor 100 includes Data Structure layer 102, mentor layer 104, and instruction interpretation and control layers 106.

Although various implementations described herein rely on a frames/bin structure and/or mentor circuits, computing devices as described herein may be implemented without a frames/bin structure or mentor circuits.

The remainder of this description is divided in two parts. The first part, entitled Resource Manager Design, addresses a Resource Manager Implementation. The second part, entitled Cooperation (parallel processing), Security, Privacy and Resource Management, describes several aspects relating to the use and the architecture and the Resource Manager in particular in parallel processing environment. The architecture may provide tools for the critically needed parallel processing paradigms in the field of scientific and other computing such as security, privacy, debug support, malware detection and software robustness.

Resource Manager Design

As noted above, in certain embodiments, a Civilware and resource management tier may be implemented as an integral part of a general purpose processor (GPP) architecture. Civilware refers to the programmable or changeable elements or parts in the Civilware tier. Civilware may be defined differently in each implementation model to fit implementation methods. After being programmed Civilware may be "hermetically sealed" in the implementation model during a manufacturing or an encapsulation process. Programmability may be implemented by various methods, including software, microcode, ROM tables, FPGA or any other suitable combination of elements. In certain embodiments, programmable means may include "programmable gate arrays", "VLIW coding", "micro coding", "obligatory BIOS code" or FP code in a processor lacking floating point hardware.

Programmability of the Civilware

Whether or not the Civilware (or portions of the Civilware) in a computing device is programmable (and by whom) may vary from embodiment to embodiment. For example, Civilware may be programmable on system development platform, but not programmable (e.g., "hermetically sealed") in systems that are exposed to security and privacy threats. What portions of Civilware are left programmable and what parts should be "hermetically sealed" by the architecture may also vary depending on the application—in commercial/institutional/end-user systems. In any given application area, the architect of the specific model may be responsible for ensuring that the "hermetically sealed" portions cannot be tampered with and the architecture defined "programmable" parts are not too cumbersome to program.

In one embodiment, a Civilware tier's attributes include:
(1) The tier is programmable by a software layer defined as Civilware.
(2) The tier enhances system security.
(3) The tier provides definitions for privacy.
(4) The tier provides a set of mechanisms that support easier program and system debug, and;
(5) The tier provides a set of tools and mechanisms for the development of new critically needed methods of cooperation. In computer terms, cooperation implies parallel processing paradigms.

For illustrative purposes the description in many of the examples given in the '022 Application was given from the bottom up "role in the algorithm" to present new devices (Mentors, Bins). Similarly "algorithmic" reasons for new HLL and machine language lexicon and constructs for coding and processing parallel algorithms were addressed. Embodiments described herein are focused on a different, "orthogonal" perspective, not how elements are (tactically) used to do the algorithmic function, but how they are administratively set up to perform their logistic (physical resource assignment, cooperation, security, privacy) and administrative support tasks.

Resource Manager Implementation

In one embodiment, the Resource Manager allocates shared resources. In many cases, this will involve assigning physical resources to logical entities. The task includes the assignment of memory ports to logical memory channels, the synchronization of control cycles with physical cycles (which is resource sharing of physical cycles by the logical channels), and the assignment of physical Mentors and Bin space, to Virtual Mentor Files (VMF), which support the virtualization of logical Mentors, such as described in the '022 Application, page 14. The task may include handling all virtual memory mechanisms, including the selection of page size, the page replacement algorithm, and all related coherency issues.

In some embodiments, a resource Manager is responsible for the enforcement of all the Civilware rules regarding Variable descriptors and the safe storage of the descriptors. Examples of Variable descriptors are given in FIGS. 3 and 4. FIG. 3 illustrates a virtual mentor file (VMF) format for dimensioned element (array). FIG. 4 illustrates a virtual mentor file (VMF) for mentor holding single variables and constants. FIGS. 3 and 4 the virtual mentor file formats in FIGS. 3 and 4 are further described in the '022 Application.

In some embodiments, a resource manager is responsible for cooperation, security, and privacy matters. The resource manager may enforce the rules and consequences regarding bounds checks violation, and the rules regarding promotion of a data Variable (data file) into a program Variable (.exe file). The Resource Manager in cooperation with the Instruction Interpreter may also be involved in parallel (cooperation) context set up and resource assignment (FUs, channels, etc.) when program context changes from sequential to "plural context" for micro-parallel (vector) operation. Note that "plural context" notion is independent of any specific algorithm, it states for example that the command "company about face" suffers a distortion of meaning when it is expressed in the sequential form of, DO I=1, N; Soldier (I) about face: END DO;
see also Simple Relaxation Algorithm example in '02:

For this discussion consider that the RM consists of a combination of (1) a set of hardwire control circuits (sequential or ROM based) and (2) a "base microprocessor". Other physical implementations are possible depending on the amount of programmability to be included in the RM to address cooperation, security, privacy and performance requirements. The design using the "base microprocessor" provides the reader with an insightful overview of the RM design:

(1) The hard wired portions of the RM respond within one or a few cycles to resource assignment and other control requests. One hard wired example is the circuitry that allocates a memory port a few cycles after a Mentor requests a memory block transfer. Other hardware control circuits coordinate the physical clock cycles to the logical control cycles, implement indexing functions, and recover from branch miss-prediction.

(2) The base microprocessor in the resource manager may include, in one example, a 32 bit basic IP type microprocessor core with no virtual memory or floating point logic.

The functions of the base microprocessor in other, typically lower performance implementations, may be the performed by time sharing the use of the algorithmic instruction interpreter hardware for both algorithmic processing and Civilware functions, in other words, performing the Civilware tasks without using a physical "base processor". This deployment is similar to the present use of the same processor for applications work and for the civilware task of virtual memory paging and Least Recently Used ("LRU") page assignment support.

Generally speaking, any element that is implemented by programmable means in one model may be implemented by hardware means in another model, and any element that is implemented by hardware means in one model may be implemented by programmable means in another model. It is the "hermetic sealing" of architecture definition by the specific model and the means by which and what should be "programmable" that may vary from model to model. What hardware or programmable means are used may be based, in some cases, on performance needs, e.g., for fast reaction on some elements defined by the architecture while the non-performance-critical parts may be implemented by programmable means and then "hermetically sealed" by appropriate means.

In one embodiment, the base microprocessor manages the tables that map the Variable namespace to space in the virtual memory and the Bins. The tables themselves may be implemented in fast memory hardware. The base microprocessor is also responsible for figuring out, through LRU or other types of resource replacement algorithms, which page in main memory or Physical Mentor circuit to replace and virtualize, and reassign the physical resource to another task.

A typical LRU algorithm is similar to a single path through a waterfall search in the resource assignment table, where A (I) contains a time stamp of the last use of the Mentors or a pages, the higher the number in the time stamp the more recently the Mentor or virtual page has been used:
V=A(1);
P=0;
DO I=1, N;
IF A(I)<V;
V=A(I);
P=N;
END IF;
END DO;

After a single waterfall path the LRU entry (lowest number time stamp) is at the location P and is ready to be replaced. In the LRU example above for Mentor circuits, the time-stamping mechanism is done in hardware since time-stamping may occur each cycle. Virtual memory page operations happen at a slower pace, as the memory transfers to/from the Bins consist of multiple word blocks, and thus all the bookkeeping may be done by the base microprocessor.

The base microprocessor may be responsible for the management of all Variable descriptors and may be the only entity that may promote a data file to a "program" status by changing the class of the Variable's data file from "data" to "program". The Civilware algorithm for promoting a data file to program status depends on the cooperation, security and privacy requirements of the facility and on applicable privacy laws.

The ability to control the promotion of data Variable to program status is a strong tool in security. It may also be a powerful tool in forming paradigms for cooperation.

Another task, the creation and storage of the OSI-RM virtual links, is done by a combination of the base microprocessor and the Mentors assigned to communications links. In parallel processing environments, these links separate the OSI-RM communications overhead from the data transfer operations. This aspect is further described in the OSI-RM Virtual Links section.

In some embodiments, the resource manager includes the base microprocessor which is "a processor inside a processor", the programs of the base microprocessor, and its data space. The data space of the base microprocessor may include: logical to physical addressing tables for virtual memory; logical to physical addressing tables for Mentors and Bins; tables of operational data transfer links among program modules (as will be explained in the "OSI-RM Virtual Links" section describing virtual links); Variable descriptors proper and/or data concerning the definition and placement of Variable descriptors in logic (virtual) memory; data concerning cooperation rules, security, privacy and rules for promotion of a data Variable to "program" status; and many other data elements associated with the administrative rules for the operation of the GPP. As an example of some of the complexities of administrative aspects, a GPP or even a thread may have multiple virtual page tables: one table for shared main memory space with other processors, and another table for a private main memory space.

In various embodiments, the Resource Manager data and program content (which implements the Civilware) may not be accessible to the main processor. The processor's program may neither read nor change the Resource Manager program or directly change its data. Depending on security and other considerations, Variable's VMF files (the VMF file contain the Variable's descriptor, see '022 plus current Variable's state; active, dormant, archived, etc.) may reside in main memory or in resource manager memory. As used herein, "Civilware" refers to a set of algorithms and data tables that define and enforces rules of behavior for elements of a system. These elements may include, for example, programs, data Variables, program Variables, processors communications, I/O, and instrumentations links. The Civilware algorithms may be independent of specific application algorithms. Civilware may be responsible for enforcing the consequences of Civilware rules violations as well as for collecting the statistics regarding rules violation patterns.

The Civilware may afford the architecture an orthogonal programmable administrative tier for handling security, privacy, parallelism (cooperation), resource management and other tasks relating to the administration of resources, as opposed to (or orthogonal to) requiring the main, algorithmic instruction interpretation processor to perform such tasks.

In certain embodiments, the Civilware tier includes all aspects that have to do with the running of the algorithm and the system except for the algorithm proper as originally defined by the HLL programs which includes the OS programs. The "rules of behavior" may imply not only the requirements of following the rules set by the Civilware, such as terminating a program and signing-off all accesses to a shared data space, but also the specifics of all the consequences of all actions taken when the rules are bridged or broken. Without this basic requirement it is hard to provide uniformity of operations that is critically needed for software migration.

The use of a separate hardware/software tier for such tasks may provide for enhanced security, privacy and cooperation support: including the provision that hackers have no access to changing the code of this separate hardware sub system. Some sub-systems in present designs, for example, the virtual memory support circuits and programs, do some of the tasks that are herein assigned as resource manager tasks.

Depending on the implementation, the "base microprocessor" may or may not receive information from main memory via a Bin or other means. Among its other tasks, the Civilware may be responsible for promoting a Variable from "data" to "program". In order to compromise the Civilware's security, one would need the ability to modify the Civilware. On one hand, to maximize security, a transfer path from main memory to Civilware should not be allowed. On the other hand, such a path may have utility for remote maintenance vendors/operators.

For typical business computing, once the Civilware system is programmed to fit the rules and laws of the operating environment (hospital, bank, retail, private PC, etc.), the need to change the Civilware should be relatively infrequent, as the governing laws-of-the-land and business practice rules have a much longer life cycle than that of the computing system. Furthermore, if a Civilware update is needed in a typical business data processing environment, the update may be preferably done on site, rather than compromising security for questionable convenience of remote maintenance.

In some cases, the Civilware tier may be handled similar to the handling of the internal (VLIW, etc.) microcode of a processor or the virtual memory support software of this particular model microprocessor. To maximize security and system simplicity, Civilware in business computers, PC, DSPs, etc. may be an integral part of the "hermetically sealed" part of the computing device, the GPP.

The rules for a typical business computing setting may, however, be quite different than the rules for a facility for the development of new, cutting edge, software and systems, which may involve new computer architecture paradigms. The systems development work may involve the following; (1) The creation of new system paradigms which constitutes creating and modifying Civilware to specific security requirements, (2) new methods for the use of physical resources, (3) new approaches for parallel processing technology where Civilware is used to create and enforce new rules of interaction (cooperation) among entities, (4) tailoring systems to the requirement of a specific customer or customer base. In the system creation environment Civilware rules and practices are being formed thus they are subject to changes and experimentations.

The resource manager may be implemented using an existing core as the base microprocessor. In one example, a processor has 8 to 48 Mentor circuits. The core may be produced by a technology providing 100+ ILP processor cores per die. The effect of the processing speed of the base microprocessor should have only a small effect on the performance of the whole GPP computing device.

As a practical design matter, having enforcement as part of the rules makes for deterministic design choices: if all the rules are not enforced, the GPP has to defer to the programmer, which may logistically be very hard to do in typical business environments as the programmer is typically not there when an issue that was not a-priori determined comes up. Civilware may be used to support new computer paradigms, for example, by allowing new methods of support for imperative paradigms of object oriented language or by making functional programming performance efficient.

In one embodiment, rather than a base microprocessor+ special hardware implementation, a computing device includes an optimized internal Civilware logistic microprocessor design with the appropriate programmability and system capabilities.

The Variable Descriptor

Defining the physical Mentors, logical Mentors, VMF which includes descriptor plus current status and may include additional administrative information. The Variable's descriptor includes the pertinent information derived from the HLL language that is needed for the resource manager tier to manage the Variable. This would include, for instance, the dimension information (2D, 3D, etc. and size of each dimension), read/write permissions, and the base location in memory. (see '022 Application, FIGS. 17 and 18 and related description). FIG. 5 is a Variable descriptor including the "program" type and the credential ID of the authorizer. The device may be similar to those described in the '022 Application on page 73 and relative to FIGS. 17 and 18 of that application. The properties and their parameters are found in the descriptor. During run time, the Mentors and Resource Manager tier may enforce the Civilware's rules, rules that are based in part on the Variable's information found in the descriptor. Methods and tools as described herein may support quick debugging, provides robust mechanisms for privacy protection and enhances security capabilities, and support parallel processing cooperation.

As part of the orthogonal separation of the (tactical) application algorithms from specifics of machine implementation the type of the operands (fixed, floating, byte string, program file, authorized program, JPG file, etc.) is defined by the Descriptor, a form that may be different than current methods where the opcode typically defines the type of operation (fixed point ADD, floating MPY etc.). In FIG. 4, a format of a Descriptor for single operand Variables and for constants, each Variable is characterized by an ID and a Type. In case of possible ambiguity, for example whether an operation should be fixed or floating the receiving result operand determines the operation type. Also note that the Descriptor carries the Variable's creator (ancestry) as an aide to system robustness support.

Examples of information that enhance a Mentor's ability to provide security are that of defining data Variables as being read/write, read only, or write only capable (Mutable field in FIGS. 3, 4 and 5). Another such example that may be used for defending against identity theft, may be the "verify only" Variable type described below.

A store employee may enter a new customer profile to the system and present the customer name or social security number in order to verify that the customer is in the system. The store employee does not have the ability to read the full "Customers-Records". While being able to access the customer list on an individual customer base, neither the store employee nor anybody else except for a single authorized legal officer may "read" the complete "Customers-Records". The descriptor of the "Customers-Records" file contains the information that it is a "verify only" file and exactly who may access the full file and what access methods are allowed.

For practical reasons Civilware may be a combination of programmable and "hard wired" elements. By necessity Civilware elements like Variable bounds checks, "control clock" circuits and physical Mentor LRU time stamp may have to respond within each clock cycle, in these cases the design is limited in the ability to make those parts of the machine "programmable". Other parts of the Civilware may be fully programmable through the Base processor and/or through Civilware code on the algorithmic (tactical) code for the computing device, as may be the case with "verify only" variable type.

Activation of a segment of Civilware functions may be done through the Variable's descriptor. The Variable's descriptor contains "Variable type" and "Variable ID" attributes (see FIG. 3). Those attributes may form a pointer to a specific system routine that, for the Variables identified by ID and type defines the procedure for handling a set of Variables, such as for a set of "verify only" Variables containing the "Customer Records".

Please also note that the Descriptor format given in FIGS. 3, 4 and 5 is an example format only and many other Descriptor formats with different field, field arrangements and field sizes and field definitions may be implemented in order to handle Variables' definition and in order to best communicate among the architecture layers. For example, the computing device product architect may increase the size of the "type" field from 6 to a significantly larger number of bits in order to allow for a large number of Civilware defined Variable "types" such that "verify only" is directly identified by "type". In addition certain "types" may be defined such that additional relevant information (parameters) regarding a particular Variable may be transferred in defined data spaces other than the Descriptors.

A "data type Variable" for forming a new program is "un-commissioned-program" (new ".exe file"). It includes a partially filled descriptor that contains the properties of the Variable. In the "un-commissioned-program" case the descriptor contains the program type and size as well as the credentials of the Program creator. The resource manager, during authorized program build time, adds allocation information (virtual memory, logical Mentor VMF, physical Mentor Bin) and other information into the descriptor, and promotes the Variable type to the VMF of a "program" type Variable. If the "program build" for this un-commissioned-program Variable is not an item on the resource manager's "to do" list, the request may be flagged as a problem and may not be honored by the resource manager. In this architecture, the "program build" may be an added as a step to include new executable programs, this step creates the new program Variable and formally may put it on the resource manager's "to do" list as a step in the creation of a new executable program.

While the basic idea of the Von Neumann concept is preserved, that a data file may be turned into a program file, the process may be restricted to "program build" occasions only. In a system used by program developers, "program build" may be turned on continually. In a bank, hospital, or insurance company, "program build" may be allowed only at authorized system updates, where, during "program build" a list of data Variables, that are requesting to be turned into "program" types, are checked against authorized new programs on the RM's "to do" list.

A key element in the Mentor design is the bounds self-check circuit: the hardware makes sure that a Variable never enters space not allotted to it. In the architecture described in the '022 Application, Variables (which includes programs) may be 1) assigned to a Mentor, and 2) may be certified as belonging to a team and given definition and attributes.

1. In this new GPP computing device all instantiated Variables, from single operand Variables, to arrays, lists, and program code files, and to more complex types, including complete programs, data bases and threads, may be assigned logical Mentors. In turn, when the Variables become logically instantiated through creation of a VMF, then logical Mentors (VMF) may be assigned to physical Mentors. While both contain data and descriptor here lie some of the major differences between Variables and object oriented Objects. Variables are elements understood by the processor hardware that has specific means, the Mentors, VMFs and Bins to deal with them and the notion of Variables is carried to the smallest algorithm visible elements like single operand Variables. Objects presently are strictly software notions and typically mainly involve high level constructs.

2. All Variables may be defined through a recursive process that may be static (all Variables are fully instantiated prior to system start) or dynamic (Variables may be instantiated during run time). The process of Variable's recursive definition is addressed in section, The "Variables namespace" unrolling and its impact on security issues.

In the recursive Variable instantiation ("unrolling") process, the descriptor of a Variable is defined and the attributes assigned. In this process, basic "teams" are also defined, typically when Variables are defined as part of a new "program" or a new "data base". For instance, all the Variables of a program form a team. A data-base system may contain one or more teams of Variables.

The "unrolling" process changes un-instantiated Variables to instantiated Variables. More complex team (multi-processor, multi thread, network distributed) structures may be recursively formed from simpler structures. A bogus .exe file cannot accidentally be turned active as the process requires that a certified program (a Variable of "program" status, presumably a compiler, assembler, or "OS program build") provides the "program type and status" attributes, requests the instantiation, and then requests the activation of the file.

The built-in enforcement of Civilware rules among participants may include mechanisms for recognizing basic computing elements such as Variables and enforcing memory address bounds for each Variable.

In some embodiments, Civilware tools may enable developers to match parallel hardware with parallel software and create macro-parallelism paradigms to improve performance and reduce development time. In addition Civilware tools may offer debug support, and security and privacy capabilities, with the implication of both the automatic bounds checks and the controlled process of promoting a data file into program status.

One implication of automatic bounds check for program debugging is: an array or program jump addressing program error is caught upon address generation thus providing full information for immediate program correction. In many existing systems (a) this type of programming error is detected many cycles after the initial error requiring lengthy sleuthing forensics to detect the error source or (b) the error stays undetected in the released software and it is tagged as "a bug". The ability to control promotion of data into program status may foil a substantial percentage of malware schemas. The resource manager and its Civilware may provide a secure methods of promoting Variables Civilware into program status, and thus it may control the process of "procreation" of programs. The resource manager and Civilware may also promote cooperation, which may enable hardware/software capability for effective parallelism.

Cooperation (Parallel Processing), Security, Privacy and Resource Management

The following are illustrative embodiments that address cooperation, security, privacy, and/or resource management. The Shoe Box Virtual Memory Space Allocation Algorithm In the '022 Application, page 18, a description was included of how Mentors can support the bounds checks thus the security of active Variables. The problem that remains is the need to extend the protection to (virtual) Variables in the "dormant" state.

This implementation uses a "shoe box" virtual page allocation algorithm, within the resource management framework, to extend the protection to "dormant," virtual Variables. The shoe box algorithm is an example of a paradigm that enhances the machine's virtual memory capabilities in cooperation, security, and error isolation functions that may not typically be associated with virtual memory space management. These capabilities may not be found in present Register Machine systems, as the hardware does not know where Variable boundaries are.

Portability of Parallel Programs and Physical/Logical Orthogonal Separation

The method described in this example associates virtual memory with "Variables" instead of "memory pages". The relevant operation of a single processor of this architecture will be summarized so as to readily apply it to the environment of macro-parallel operations and shared memory. In this architecture, the processor speaks in terms of Variables, instead of memory pages or registers. Once the RM/Mentor/Bin infrastructure learns, from the Variable(s) descriptor(s) and instruction decode, what the Variables' structures, properties, algorithmic operations, and respective sending/receiving locations are, the RM has all the information it needs to provide for several security and enhanced performance capabilities.

For a single processor just concerned with its own private memory, the resource manager now proceeds, in its own way and independent from the instruction decode, to operate on and manage the virtual memory needs of the Variable(s). For instance, the resource manager may know if a Variable consists of an array of elements that all are going to be, say, added in parallel to the elements of another array, and then may control that parallel operation. No additional machine language code instructions may be required for the RM to accomplish enhanced performance through micro parallel operation, which may include the resource manager's complete responsibility to manage the main memory and virtual memory needs pertaining to the operations of the Variables, to perform bounds checking for the Variables, to check property rules such as read/write, and more.

This same framework may directly apply to the environment of shared memory among several processors and macro-parallel operations. Operating each of the shared processors in terms of Variables, just as for the single processor case, may allow the information, belonging to each of the Variables and teams of Variables, to be used to provide protections, including bounds checks, among the sharing processors and threads. The resource manager responsibility mentioned above may include operating shared memory in the cloud through the "Infinite Variable" construct. As before, the resource manager may perform this work without the need of explicit coding instructions by the programmer, except as the basic of the HLL algorithm (the tactical/mathematical algorithm).

This method and implementation also supports code portability, as the implementation of most all memory operations and operations of other resource are handled independently from the HLL code. Each computer system may likewise be able to independently adapt the logical memory needs to the specifics of its own memory hardware setup: this mapping of logical requirements to physical resources is a logistics issue and the resource manager tier of each system may take care of this by specific methods of mapping the logical entities to physical spaces and physical entities.

In summary, this architecture may allow for the full orthogonal separation of physical memory structures from the logical "private memory" and "shared memory" spaces and other physical binding issues concerning users (or threads, or processors) that operate sequentially or in parallel.

As an example where the same problem reflects into two different mapping methods, consider two installations, one installation has N processors with all processors owning a 10 G private memory and sharing access to a physical 100 G shared memory. The other installation is of N processors each having a 10 G private memory and all sharing 100 G allocated space in the cloud using a memory of unknown size. Physically the systems are different, logically they are the same.

This physical/logical separation (i.e. tactical/logistic separation) may allow for creation of parallel processing programs (and parallel processing paradigms) that are independent of a particular installation's hardware configuration, without those capabilities parallel programs may not be portable and new paradigms may not emerge.

In just about any parallel processing program that is operating on a set of processors or threads, there is bound to be some private memory for each processor or thread and some shared memory spaces where processors may share information and/or keep semaphores used to coordinate the activities of the parallel process. Some installations may have physical shared memories to support the shared logical memory function. Other installations may have networked communication links among the processors and will form the shared semaphore space using the network and an assigned processor for doing the semaphore/shared memory space task.

In order to have parallel algorithms that are portable among installations, and however the logistic function of implementing the shared spaces is done, the physical means of implementing the shared space should preferably be totally separated from the parallel algorithm proper. The parallel algorithms should only specify private memory spaces and shared memory spaces and, in the shared space, the discipline used in the shared spaces (who has the rights to change what information and when).

The mapping of the parallel algorithm memory space requirements is preferably done by a separate logistics support program tailored for the specific installation. This logical/physical separation cannot easily or effectively be done as long as the basic virtualized element is a page rather than an entity like Variable, which carries with it the necessary information, such as structure, size, properties and memory address corresponding to the particular application's HLL variable it was compiled to implement.

In present Register Architecture systems this logical/physical separation may be very difficult to effectively do since shared memory is associated with memory pages that are mapped by the virtual memory system but are unrelated to the logical entities handled by (parallel or sequential) programs. Without the knowledge of the logical entities (their structure, address, size, etc.) the hardware has no way of managing their operations without additional software in the algorithmic code section. Since this additional code deals with logistics and resource issues it is also unlikely to be portable. The method described herein virtualizes the memory space assigned to Variables, and thus affords the logical/physical separation for cooperating processors (parallelism), security and privacy.

Space Allocation by Resource Manager (Example: "Shoe Box" Algorithm)

In an embodiment, space allocation by a resource manager includes the resource manager selecting vessels from a range of vessel sizes based on the Variable size. The "shoe box algorithm" described below illustrates space allocation using vessels of different sizes, in this case, shoe boxes, cartons, pallets, and containers. Space allocation for all Variables that are not one word each is done using an "8× shoe box warehouse algorithm". 8 shoe boxes fit in a carton, 8 cartons fit on a pallet, 8 pallets fit in a container. A large number of containers may be needed to provide the memory space for very large arrays. The largest element (container in this case) is significantly smaller than physical memory. The shoe box size is determined by the size of the block transfer in the Variable updates. The base microprocessor determines vessel size based on Variable size. Vessel size may be one or more shoe boxes, cartons, pallets, or containers. With exception of single word Variables, no two Variables are placed in the same vessel.

In the shoe box approach, the shoe box is, for example, 32 words of virtual memory space. Any space allocation is given in the vessel size that may hold at minimum the full Variable size. So if a new program requires two large arrays (each array is a Variable), three medium size arrays, three small arrays and a collection of single Variables, the program may receive two containers (one each for the two large arrays), four pallets (three for the medium arrays and one for the program) and four shoe boxes (three for the small areas and one for the collection of single Variables).

Though the method may appear somewhat space wasteful, it may be more efficient than allocating exact size areas to an application. In addition to supporting parallel processing, the shoe box method may allow for better arrest of violations, as a Variable that contains more than a single word is always placed in its own shoe-box, carton, pallet or container(s). Several single word Variables may be placed in a shoe box since array indexing is not involved in fetching the Variable's operand. A single Variable's address is found directly through the namespace table look up, and thus out of bounds addressing should not occur there.

This approach may improve space recovery in that it does not result in fractured, non-standard size areas. Furthermore a "shoebox warehouse management program" may alert the system regarding programs that terminate without properly releasing shared resources. In some cases, Civilware on a program's machine keeps a table of Variables for the program, and when program deactivates, the Civilware deals with each program Variable and will discover if shared memory corresponding to a Variable has not been released.

For a program using multi processors and shared space, a report may be issued by "shoebox warehouse management" that, for example, a particular program, whose Variable ID is "3FE478A1" has signed on but never signed off. The discrepancy is noticed when the particular RM who manages the shared memory receives a note from the RM that activated the program that the program is deactivating but the program itself failed to sign-off correctly.

The Civilware of the shared memory RM may also discover a variable in shared memory not owned by the program activator, but somehow owned by a program copy running on one of the other processors, is still active. This would be an indication of a Civilware rule violation as it could lead to more serious issues/error conditions.

The shoe box and similar virtual memory space management algorithms form the complementary part to the Mentors circuits in terms of bounds protection. Active variables are afforded intrusion bound protection by the Mentor circuits, however dormant Variables may or may not be afforded intrusion protection through higher level (ancestor) active Variables. The very fact that, for all Variables that are not a single word, only one Variable may occupy a page, allows the virtual memory management to step in where the Mentor circuits left off in affording memory space intrusion protection.

The assignment of space resources for Variables may be done during Variable recursion roll out, which may be as described in a following section.

Some methods by which dormant mentors may be provided memory space protection thus include:
1. Through the recursion ancestor. Even if a Variable is dormant an ancestor Variable that created the program or the thread may be active. This ancestor owns the memory area in which the dormant variable is a sub space. This protection protects from intrusions by other programs or threads, but not from members within the same program or threads "stepping on each other's toes".
2. Dormant but conscious, a Mentor is dedicated to the dormant Variable even though it does not have allocated Bin space. This case would happen in situations where there was not enough Bin space for all the assigned Mentors as well as other situations, especially in real time systems and debugging when the programmer suspects a problem in a memory area and sets up a Mentor to just monitor the area.
3. The individual storage space per Variable as done in the shoe box algorithm. This applies to all Variables whether they are active or dormant. Note however that for the active Variables the bounds checks by the Physical Mentor immediately identifies the addressing computation that is causing the fence jumping error while an error caught by the virtual space management (shoe box, etc.) may show up only when virtual pages are swapped between memory and the backup medium.

Only method 2 provides the full space protection of the method provided for active Variables, but the combination of method 1 and 3 should prove to provide far better memory space protection than present systems using Register architecture cores.

Also note that, since in order to generate a memory address a Variable must be active, breaching a dormant Variable space requires two Civilware breaches, one in the self-check of the erring (or compromised) active Variable and a second breach of the virtual space manager (shoe box or similar algorithm).

Note that the shoe box algorithm may be practiced in both disc space and main Memory space allocation.

The shoe box algorithm may protects a memory area from errors made by someone generating an address that extends beyond the area allocated to them into someone else's area (malicious or by error fence hopping). The shoe box algorithm does bounds checks (or bund concatenation) on all disc accesses to make sure no fence jumping has occurred.

Since the shoe box algorithm vessels start and end at binary boundaries, logic mask or concatenate operations may be used to make sure the address is never out of bounds. The address in a vessel (shoe box, carton, pallet, etc.) is of the XXXXXXYYYY type where the allocation algorithm generates the X bits and the program generates the Y bits. Y bits over vessel size are either (1) ignored and a program's addressing error falls back to place in a program's space or (2) an error is generated if non "0" bits are found in the "X" space. So as long as the space allocation program itself does not make errors and protects the integrity of the vessels, a dormant variable's space should not be broached by other programs.

In certain embodiments, all Variables that are not a single word are placed each individually in vessels that start and end at standard binary blocks. The program writing/reading into a Variable's space, whether through malice or by erroneous "fence hopping" from neighboring areas, or by any other address extension means, may be avoided.

Algorithms like the "shoe box algorithm" may need special adaptations in some particular application fields. Although it might be hoped that there is a superset of rules that will fit all computing systems, it may be that one may at best develop a consistent set of rules for each individual field, e.g., different sets of Civilware rules, regarding computers and computer networks, for each of the following fields: scientific modeling, software system design, medical, banking, retail, wholesale, gaming, entertainment, government, law enforcement, etc. The basic reason is that each individual business field is governed by different set of "laws of the land", and in addition has different user requirements and market requirements. It is the "law of the land" that may determine about the rules of cooperation security, and privacy.

Viewing the role and importance of Civilware rules enforcement for security and privacy, the consequences of security and privacy violation can be easily seen when one takes the victim's point of view. The rules may, however, also fulfill the role of Civilware enforcement regarding team cooperation. Regarding cooperation, the issue is not so much the automatic rebuff of an attempt (intended or unintended) to do malice, but that the enforcement mechanisms provide a uniform interpretations of what the rules mean to all programs and programmers. Without the hardware assurance of full rules enforcement checks one relies on behavior expectations, programmers will tend to program very defensively using time and resources for checking against possible behavior violations by others thus making operations inefficient due to redundant and excessive of expected behavior violation by others.

Applicability of Shoebox and Similar Algorithms to Current Systems

The shoebox and similar algorithm may be applicable to present Register architecture systems and used to enhance system robustness and malware resistance. Specifically this requires that the compilers, assemblers and other programs involves with space allocation in virtual memory and physical memory retain and use information regarding the space allocated to each Variable.

In present terms this means virtual and physical spaces are allocated to individual programs, arrays, graphic files, other files, and other forms of data. Next it requires that the space management system may be enhanced such that space is allocated via containers assigned to individual programs, arrays, files and other forms of data. Furthermore the system may retain and use "authorized program status" information, specifically which memory elements are recognized as executable code files either directly by the hardware or through interpreters.

The operating system than may be programmed, or present hardware may be modified, or both, to check the credentials of any data files that are requested and sent to the program cache and report unauthorized request to execute non authorized data elements as programs. Interpreters may need to be similarly modified to recognized the program authorization status and report rather than execute unauthorized data files.

The "Variables Namespace" Unrolling and its Impact on Security Issues

Where the namespace for operand and program in present Register architecture computing is [Memory+Registers+Vector Registers+PSDW+ . . . ], the namespace in this computing device is just [Variables].

The [Memory+Registers+Vector Registers+PSDW+ . . . ] namespace is a "flat" definition: the namespace content consists of the items listed. There is no further information about the structure of the content, except for the enumeration (addresses) of the locations of words in Memory, Register (number), Vector Register (number), PSDW, etc.

While the Memory of a typical present GPP may have a three (or more) level structure (cache, main memory, and hard drives), this structure is invisible to the software. When programs are in HLL, structure information is provided in the HLL code: specifically, array declarations, program beginning, program end, call, etc. All this information, while used by the compiler, may not in present Register machine systems be transferred to the executable machine language instructions in a form that can be easily deciphered by the hardware, and in places such information is not even possible to reconstruct from the executable machine language instructions. The "subjects" in today's machine language are registers and memory locations, and, once the HLL is transferred to "register" formats, significant information contained in the HLL may not be practically reconstructed.

The [Variables] Space is Defined as a Tree that is Formed Through the Recursive Definition of [Variable]

In the illustration that follows, Meta notations are used, a modified BNF (Backus Naur Form). The "::=" operator means "is composed of". The "|" operator means "followed by" (or "and/or"). To avoid the excessive recursion of BNF the set operator "$" is added to the BNF, with the meaning "a set of".

Using Meta notations the part of a real tree above ground is:

Branch::=$ Leaf|$ Flower|$ Fruit|$ Thorn|$ Branch;

Branch is a recursive entity while Leaf, Flower, Fruit and Thorn are terminal entities.

Using Meta notation "Variables" is a "Node-type-Variable" further recursively defined as:

Node-type-Variable::=$ Data type Variable|$ Program type Variable|$ Infinite type Variable|$ Interpreter type Variable|$ Node type Variable;

In addition to the recursive genealogy definition Variables are defined as a combination of two information sections, a descriptor and "data/program proper".

The "data/program proper" section may be null, the descriptor may not be null. Typically program or data are only found in terminal elements of the recursive definition, but this is not a mandatory requirement.

When the tree structure is fully rolled out, and "infinite Variables" (communication links on page 12 of the '022 Application) and descriptors are removed, one gets back to the flat [Memory+Registers+Vector Registers+PSDW+ . . . ] namespace model for Register Architecture machines.

The first three elements in the Variable recursive definition are terminal elements; the last two are recursively defined. The first two elements are data files and program files, the third "Infinite Variable" is either a connection to instrumentation, I/O, or a physical or logical communication link between (or among) communication links in other systems that (in case of a logical link) may operate through a physical communication link or through a shared memory mechanism.

The last two entries "Interpreter type Variable" and "Node type Variable" are recursively defined. The "Interpreter type Variable" is defined through a set of terminal "Data type Variable", "Program type Variable" and "Node-type-Variable" the operational definition of all of which can be changed not only through compiling but also through run time information. The following explanation concentrates on the main recursive element in the Node-type-Variable or simply Node.

Parallelism of programs, threads and processors is not addressed as a single issue, but as a set of disciplines and techniques (or paradigms). The mechanism of Civilware rules enforcement provides a set of tools for the development of both the hardware and the software paradigms; the tools form the underpinnings of implementing those new paradigms.

Three parallel disciplines that form a part of the needed set of paradigms, Variable based virtual memory (see shoe box algorithm), micro-parallelism and OSI-RM (Open Systems Interconnect Reference Model) virtual links. In each case the implementation of the approach in the devices as described herein may be done through Civilware in a resource manager and/or in Mentors. In addition to the implementation through Civilware, new HLLs' constructs may be implemented, such as the ones below.

Micro Parallelism

In some embodiments, devices as described herein include micro-parallelism in the architecture. Micro parallelism is generally recognized as vector processing, however the approach taken herein is broader and avoids the distortions produced by vector registers. This micro-parallelism involves at least the following three aspects.

The first aspect is that new linguistic elements for addressing the micro-parallelism paradigm are used to add "plural" constructs to the (DONA) in "'022 Application" machine language lexicon. The "plural" addition is done through adding IMMUTABLE and/or ALL (or other linguistic mechanisms that properly express plural notions) to the (DONA) machine language. In contrast to vector instructions in vector processors, where the use of vector instructions requires significant material changes to the sequential machine language coded algorithm, the use of ALL instead of DO does not materially change the algorithm proper but allows (by the difference between DO and ALL) for specifying a different context (micro-parallel instead of the sequential context) for essentially the same algorithm.

A second aspect is that the corresponding plural context constructs of ALL and IMMUTABLE should be added to HLLs in order to make the use of parallel operations a coherent subject.

A third aspect is the implementation of micro-parallelism in devices herein is native to the architecture using Mentor/Bin or similar mechanisms and thus the proper use of plural information is done through the DONA instructions interpretation, the Civilware in the resource manager, the Mentors and the Bins.

OSI-RM Virtual Links

The OSI-RM (Open Systems Interconnect Reference Model) Virtual Links provide a method to reduce present inefficiencies related to communications and I/O protocols for both data transfers and control interactions among networked system elements (NSEs). OSI-RM was also adopted as the International Organization of Standard as ISO/IEC 7498-1. It may be difficult, for example, to get efficient simultaneous activity among a team of NSEs in a parallel processing environments if interaction among the team members are laden with high protocol overhead per data transfer and/or control operation. This high communications overhead problem has its roots in two related issues.

The first issue is that many present protocols may not recognize a program as a logical entity for the sake of communications; they may only recognize a (physical or logical entity) processor or a thread (logical entity). The OSI-RM Virtual Links being logical entities may be formulated such they recognize individual programs as logical entities.

Figure 6:
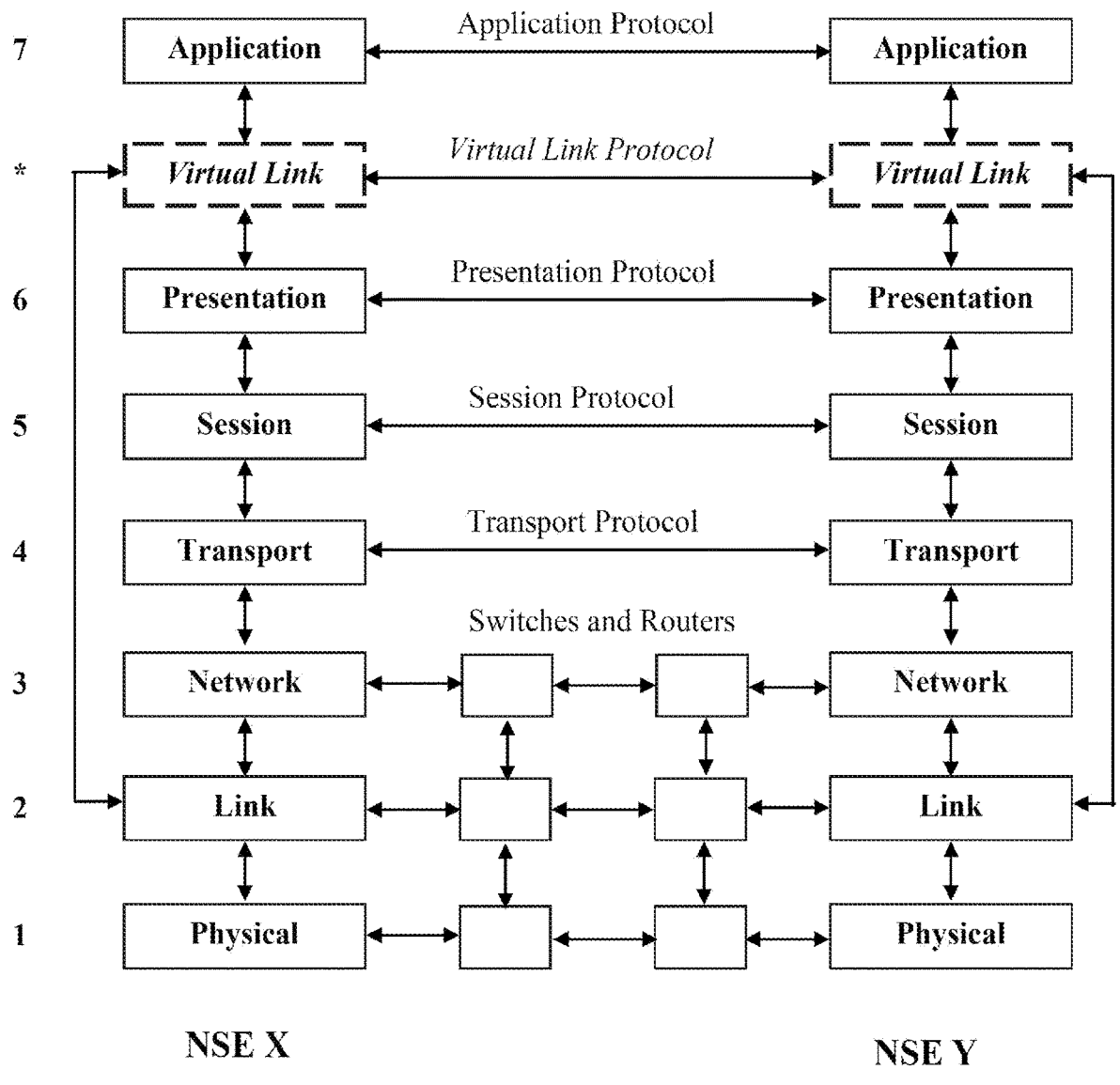
FIG. 6 illustrates system using a modified OSI Reference Model containing an OSI-RM Virtual Link Layer according to one embodiment.

The second issue is the nature of cooperative programming of the layered structure of communications and I/O protocols, which are typically modelled after the OSI Reference Model (OSI-RM). FIG. 6 illustrates system using a modified OSI Reference Model containing an OSI-RM Virtual Link Layer according to one embodiment. The nature of cooperative programming for I/O software systems often results in an amalgamation of many different modules authored and maintained by many different hands. While this cooperative effort adds robustness to the protocols it also makes it very hard to minimize the protocols' session overhead.

To introduce the nature of the problem, consider the situation where program A on processor X (NSE X) wants to exchange information with program B on processor Y (NSE Y). Program A will perform a Call that will initiate a protocol session. The session will amble down the OSI-RM protocol layers on NSE X, sometimes repeating many of the same tests at each different OSI-RM layer. The reason of the replication of tests is that the software of the different protocol layers is typically maintained by different groups or even different organizations. Once the connection at the physical layer is established, the tests are now repeated on NSE Y, and handshakes are performed between the corresponding OSI-RM layers until the requisite transaction is finally accomplished.

This high overhead process is repeated each time any of the programs on NSE X communicates with any program on NSE Y.

In one embodiment, using Civilware mechanisms, the two corresponding Mentors assigned to the communications tasks may untangle the data transfer from the repeated protocol overhead by establishing Virtual links among programs. Once the OSI-RM protocol is traced at the link's onset, the involved Mentors and the Resource Manager Civilware may keep the new virtual connection viable until one of the two programs signs off. The protocol overhead is thus paid only once, at the link's onset.

OSI-RM Virtual Links and Civilware rules together may address complex cooperating environments; as for example, the OSI-RM Virtual Links may significantly enhance the cooperation and performance of "processor teams" in a multi NSE parallel processing setup.

Due to the importance of creating effective processor teams assigned to a single parallel processing task, one may seek to just simplify the protocols thus reducing the high overhead associated with communications protocols; this however may be unlikely to occur for the typical parallel processing tasks, for the reasons outlined below.

The many hands that are involved in developing protocol software give communications software the strength of industry wide support. Many hands in the process however also make it difficult, technically and politically, to optimize the protocols in order to produce more efficient protocol sessions. In addition, the markets' strive for higher security is likely to increase protocol complexities and thus increase the difficulty to optimize protocols. The approach described in this section does not strive to optimize the protocols themselves but strives to maximize the number of data and control transactions per protocol session.

Factors Contributing to Protocol Overhead

Communications protocols must deal with a plethora of errors and failure types and be able to properly recover from all of them. Fully debugged communication protocols are critically important to system robustness, reliability and security. Without proper operating communications protocols, modern systems will crash in a fraction of a second. The checks built into communications protocols are responsible for detection of intrusions by errors or by malware. Application programs depend on the communications protocols to deliver the data to its destination without errors or distortions as the data may be held in a buffer space, and once delivery is confirmed the buffer space will be used for the following data set.

As concerns about security increase, communication protocols add complexity such as encryption. Encryption adds significant overhead and may alter the operations of other parts, as for example, malware detection routines may not be able to detect malware in an encrypted file. Therefore if the past is any indicator, one will expect communication protocols in the future to be more complex, and to do more (overhead) work.

Communications protocol optimization just for highly parallel production runs is unlikely. One may, for example, hope that the problem of communication protocols overhead may be simplified when the task is a single, pre vetted, and parallel processing team production run. Note that vetting the data and the participants is a very large portion of protocol overhead. Now consider a team of processors, operating in parallel that may execute a single application where all the input data is present in various memory elements in the system so no new un-vetted data enters the production run, similarly all the team's processors and programs have been vetted. One may hope that pre-vetting may reduce the communications overhead, but this may not be the case.

The very fact that a large portion of the communication protocol overhead tasks are not needed for this particular run, does not automatically remove any of the protocol tasks from the software in the interaction sessions of each OSI layer and thus, unnecessarily in this case, having to go through the full set of communications protocols, independent of the fact that all the data and participants have been, in this particular case are already vetted. Pre vetting however still makes sense as it protects the production run against premature termination due to vetting rejections of data or participants.

Reasons sessions overhead is hard to minimize are: (1) vendors of protocol IP will typically provide software only for the most general case and (2) the same multiprocessor system that is used part of the time for the specific parallel production run is used in other parts of the time for "cloud server" type processing for multiple users, the processing of different individual tasks, with each task using its own set of one or more processors and deploying unknown and unvented data. It thus becomes prohibitive in terms of cost, complexity and maintenance to customize a system's communications protocols for each particular configuration of production runs.

The approach of the ISO-RM Virtual links is not to try to simplify the communication protocols in order to make them more efficient, but to make maximum use of the fact that a communication protocol session has been established for sets of communicating programs. Following are two embodiments of the Virtual Links methods.

Speculative-Bandwidth-Usage Method

The Virtual Link Layer in this design example allows up to 256 Virtual links (conversations, communications threads) to share a physical link using the same protocol session.

The Speculative-Bandwidth-Usage method and the following City Bus method introduce a new "Virtual link layer" below the OSI application layer, see FIG. 6. The Virtual link layer is unique in that, in addition to communicating with one layer above and one layer below; it may also communicate directly to the Link layer in managing Virtual Link communications. Similar implementations, with different technical tradeoffs are possible where the OSI-RM Virtual Link layer is communicating with one or more lower layers (Link, Network, Transport, Session and Presentation).

Using the Virtual Link layer, 256 threads may time-multiplex the link that previously was used by only two communicating threads per protocol session. The Base processors (FIG. 2 item 78) set up Virtual Link tables (FIG. 2 item 82) in the communicating NSEs holding the operative status of the OSI-RM Virtual Links. This status is presented to the Mentors supervising the communications I/O channels that in combination with the Base processor may be responsible for the Presentations, Session Transport, Network, Link and Physical layer functions of the communicating NSEs (FIG. 6). Presentation layer through Network layer tasks may be the responsibility of the Base processor (FIG. 2 item 78). The Virtual Link protocol sessions may be carried among two or more NSE user sets. Two NSE user sets in standard transactions and several NSE user sets in broadcast transactions.

The Virtual link layer adds a header byte containing the Virtual link ID to data or control communication transmission frames (the load portion of the communications frame), thus it may be considered an additional header to the existing header(s) called for in the existing communications protocols. The ID identifies one of up to 256 user sets of routines that may be the users of the Virtual links. Each user set typically consists of two routines on each of two processors, however, a particular set may include a group of several routines on several NSEs, for example in cases where one NSE simultaneously broadcasts its data to several NSEs.

Up to 265 user sets of routines may time multiplex the physical communication link. The Virtual link layer is responsible for establishing the Virtual links, assigning them an ID, and terminating the Virtual links. The termination of the link may be based on one of several reasons including; the termination of one or more of the routines using the link, the LRU algorithm specifies the link termination, a usage time out, or other reasons.

The Speculative-Bandwidth-Usage method relies on the expectation that the routines that initially establish the link will be repeatedly reactivated (by a Call) and called upon to transmit/receive data. The method tracks whether or not each repeated Call for data transfer occurs within a given time period from the previous data transfer.

The Virtual link layer keeps the physical link active (does not disconnect) for a fixed period of time after each transmission, either by serving other Virtual links using the same physical link or by sending/receiving blank data. By sacrificing this bandwidth and using anticipatory techniques similar to branch prediction, the Virtual link layer program decides (gains confidence in) which Virtual links should be kept alive and which should be discarded, and thus supports the main goal of paying less protocol overhead time by reducing the number of times new links need to be established and thus recertified through the protocols. The speculation part therefore is in anticipating the time period for the next Call on requesting a transfer of data or control action and in using extra communications bandwidth during this anticipatory time.

The City Bus Method

The City Bus method similarly sets up a Virtual link layer below the application layer, again using a header byte containing the Virtual Link ID in each transmission to enable one of the 256 user sets of routines. This method uses an LRU algorithm to decide which Virtual links to keep and which Virtual links to discard. Any routines whose links were discarded must thus reinitiate their reconnection by requesting another transmission and go through initiating a communication session.

The main difference between City Bus and Speculative-Bandwidth-Usage is that the physical link is used in a time synchronized fashion. Each fixed amount of time, for example every 30 microseconds, a new physical transmission session is initiated by the Virtual link layer. In each session the Virtual links that requested transmission during the last 30 microseconds may receive accommodation. Each transmission may also include the protocol handshake communication information for setting up new Virtual links for new links or links for routines that need to reestablish their communication links. As is normal in protocols, some of the new requests may not be successful and thus denied and may require another attempt.

The City Bus method may have a higher efficiency of bandwidth use than the Speculative-Bandwidth-Use method; however the method may take longer to conclude the initiating protocol session, and may not operate for protocols that rely on quick physical layer response times to verify that the physical communications media has not been tempered with.

This arrangement captures the spirit of Civilware procedures. Once the (Civilware) programs establish trust in each other by whichever protocol mechanism is appropriate for the task, the hardware (i.e. "hermetically sealed" GPP architecture definition) may keep this relation in place, thus avoiding most of the repeated overhead of the complex protocols needed to establish the trust. This new software/hardware paradigm herein is the establishment of the "OSI-RM virtual links."

The orthogonal separation of the Civilware Tier from the Instruction Tier enables implementation of the Virtual Links. The "Virtual link layer," which is necessary for either method described above, may require specific hardware and software which, in the '022 design examples may be a part of the Mentors ('022 FIG. 13, 14, 15) and the I/O Functional Units ('022 FIG. 13). This hardware and software may be needed in order to perform the OSI-RM Virtual Link functionality.

The scenario described above, as relating to communications links, applies to "team cooperation" in any form of breaking a task into multi-threaded operations. A problem in macro-parallelism is the untangling of the following from each other:

(1) The intrinsic work done by individual threads;
(2) The administrative work of scatter (where multiple threads are launched), mid-point synchronization, and gather (where threads are terminated);
(3) The assurance overhead work that is done as a function of the amount of trust or lack-of-trust among elements and their operating environments.

An objective of the Civilware mechanism is the creation of a high trust environment (3). Another objective is to facilitate all the logistics of assigning physical resources to the logical elements in charge of doing (1) and (2)

The programmable Civilware may be implemented in a protected "hermetically sealed" programmable architecture tier through mechanisms that make the tier fully capable of enforcing the Civilware rules governing the behavior of the algorithm tier, which may include both application and operating systems software. The Civilware tier is "orthogonal" to the algorithmic tier in that the rules it enforces apply to all Variables and the rules are independent of the specifics of a particular applications algorithm. In various embodiments, the tactical portion of the machine, the "instructions interpretation" tier, deal only with the algorithms independent of the computation environment; Civilware and the OS may do the rest. In many implementations, performance critical functions are preferably done by the Civilware, as the OS through software may not be fast enough. The development of new paradigms such as the shoe box algorithm or the "OSI-RM virtual links" may move the fence between OS software and Civilware (or hardware by dint of "hermetic seal") as was the case when the paradigms of Floating Point, virtual memory or cache were introduced and hardware took over some previous software domain functions.

Civilware software may be programmable on machines used for software and system development, and may not be programmable on production models for any market segment that is sensitive to the risks of security and privacy violations. The particular Civilware version implementation of the various models that differ by market and by core performance is left to the designer and manufacturer of the various models.

The implementation approach of various models may be done similar to present handling of the design choices that enable one to design machine code compatible product entries in which the high end entry is a 64 bit "all hardware" processor and the low end is a "VLIW microprogrammed" processor design that uses a basic 32 bit data structure.

As used herein, the term "micro-programmable" or "VLIW micro-programmable" refers to a class of processor core design technique that may be used especially for low end entries like DSPs. The user and the OS programmability of all cores belonging to the same family is the same for all the family members independent of the "micro-programmable" or "hard wired" methods used to design the core. The low end core device programmability is identical to the programmability of the high end devices. Those "micro-programmable" techniques also include the "BIOS type" approach of obligatory software provided by the IC vendor to make the core "whole". Other examples are a floating point package for cores having only fixed point hardware, virtual page replacement algorithm in support of the virtual page hardware mechanism, or just a basic I/O program known as BIOS.

Any particular hardware implementation may use a mix of hard wired and programmable devices to implement the Civilware tier as well as other parts of the core. The choice of approach in each particular implementation may be based on considerations such as: circuit response time, programmability, security and cost. Some circuits must be hard wired due to the need to respond in one or a few cycles. Some of the functions performed by a "base microprocessor" as described herein could be done by time sharing the main algorithmic processor, similar to the handling of virtual page replacement algorithms by some current processors.

In summary of the programmability issues:

(1) Regarding implementation techniques for the different models, the implementation of devices and methods described herein may use many design techniques not specifically noted in our design examples. Micro-programmable and VLIW micro-programmable techniques should not be confused with user or OS programmability which should be defined through the "hermetic sealing" of the core product.

(2) Regarding the programmability of the Civilware: In a GPP model targeted for the scientific and program development markets, maximum Civilware programmability may be desired to aid in the development of new computing paradigms; this however may leave the processor exposed to malware, unless special strong means (encryption, etc.) are developed to protect the Civilware from unauthorized changes.

In implementations geared toward the low end (e.g., DSP) where cost is critical or toward the business, government and other security sensitive markets, a preferred choice, based on cost and security consideration, may be to block all means of making changes to the Civilware, as the underlying rules specific to the application (e.g., business management, legal) may be very slow to change and having hardware that is incapable of changing its Civilware ensures that the Civilware will not be tampered with.

Real Estate Model

In the context of implementing Civilware rules in computing systems, an analogy to a "bundle of rights" real estate model may apply. When one buys a home including the land on which the home stands, one legally owns only a bundle of rights to that property. Only sovereign governments may truly own land and the sea and airspace adjoining it. The state and city hold taxation rights to the property, the utility companies hold easement rights to place electric, phone, gas, water and sewer lines in the property (usually at the property's edge). In this model, the sovereign authority is ultimately responsible for both setting up the laws and taking responsibility for enforcing the law.

Similar factors may be encountered in setting up a multiprocessor environment and communication links. Cooperation under strictly voluntary Civilware rules may be workable for only small homogeneous groups. When the groups grow in complexity, size or heterogeneity a rules enforcement mechanism is needed, the first reason that rules are broken is typically not malice but the true different interpretation of what the rules mean by different individuals.

Under the "bundle of rights" model in real estate, there is no "one size fits all" Civilware rules solution. For example, the residential area rules do not fit with the rules set for an oil refinery area, a military training zone, an agricultural land for raising corn or cattle grazing on government land. Similarly, a computer system is subject to the "law of the land" and must conform to its rules even though different sets of "laws of the land" exist that conflict with each other. Laws governing patient privacy in hospitals are markedly different from laws that govern customer's information in retail chains. Thus, it is not necessary or even may not be possible to have one simple set of rules that cover security and privacy for all form of computing; the Civilware rule set may be drafted in such a way that the rules are only consistent within each computer use sector.

Program Activation Discipline

In some embodiments, a Civilware layer controls the promotion of a data file into a "program status". Three distinct types of "software build" that might be considered:

A. The process of unrolling the recursive definition of top (root) Variable leads to terminal type "program", "data", and "infinite variable" where "program" type Variables will never request the creation of new Variables.

B. The process of unrolling the recursive definition of top (root) Variable leads to terminal type "program", "data", and "infinite variable" where "program" type Variables may request the creation of new Variables, but only of the "data type" Variables.

C. The process of unrolling the recursive definition of top (root) Variable leads to terminal type "program", "data", and "infinite variable" where "program" type Variables may request the creation of any type of new Variables.

In case A, the definition of a new program is added to the system and is recursively "unrolled" by the system at system build. The unrolling may be done statically or dynamically.

In a dynamic activation the tree unrolling stops at by the first "program Variable" in the tree being activated through a Call. The program is then assigned logical Mentors that may be assigned physical Mentors on demand and held by LRU or similar algorithms. Other parts of the tree are activated as needed through Calls. The Variables may be converted to logical Mentors and VMF entries and assigned physical Mentors base on need and/or authority. Physical Mentor assignment based on authority may be practiced for example in real time systems, where the foreground task (gun fire control) keeps Mentor resources locked and ready to actively respond in a few machine cycles while background processing tasks (gun maintenance tasks, ammunition inventory control) are taking place.

In static activation the Top Variable tree is fully unrolled based on descriptor information and converted to VMF format and all data and program spaces in virtual memory are allocated for the entire tree. The new top Variable is thus being fully authorized. Following the roll out the tree may be activated through a through a Call.

Strictly from the security point of view static activation may be the preferred method as it invokes three different security mechanisms. The first is the secure promotion to "program" status, the promoting Variables to active program status is done all at once. Once the "unroll" and activation step is done, "data" no longer may be converted to "program" status based on new inputs.

The second mechanism is Variable self-bounds check, even if the algorithm has an addressing error and wants to jump outside its allotted area, self-bounds check arrests this action.

The third mechanism is the vessel instead of page allocation; the vessel management system includes provisions such that only a single "dimensioned Variable" may occupy a container therefore an addressing error may not cause a "slide" into another Variable's space (see: The shoe box algorithm). It is noted that many present virtual memory management schemas are not using this technique since the hardware does not know where software array or file boundaries are. The vessel allocation system complements the Mentor circuits in that it may provide intrusion abetment against intrusion into the memory space of dormant (virtual Mentor controlled) Variables.

Case B security considerations are similar to case A, though new "data" Variable creation and storage allocation and retrieval are operating dynamically, no promotion of data into program status occurs outside the allocated "program build" time.

Case C is the most security exposed proposition, though it still has two unaltered mechanisms, bounds-check and individual Variable per vessel allocation to rely upon, as well as a "Civilware" program in charge of the process of promoting "data" types into "program" status.

The ability of the Civilware to immediately flag attempts at unauthorized promotion to program status should also prove a deterrent to activation of malware. Case C type machine operation is needed where the software requires program generation followed by immediate program activation. The latter may be needed in software and systems design and generation, agent programs in client systems (HTTP cookies) as well as in algorithms based on recursive reasoning, artificial intelligence, games and other entertainment systems.

Most security conscience institutional systems, for example systems in hospitals, banks, government, retail, etc. might operationally do well by using case A and case B and permanently turning off the capability to dynamically and/or remotely authorize the activation of new software.

Computing devices may include one or more processors and one or more memory devices. In some embodiments, a device includes two or more processors. The two or more processors may be integrated into single package. In some embodiments, instructions are carried out and resource management functions are carried out by hardware that has been integrated into one package. In one embodiment, a second processor is wired into a device to support resource management task of assigning physical resources (Mentors, Bin space, memory pages, etc.) to logical entities. In certain embodiments, one or more tasks are carried out in a hardware device separate from a main device. For example, in one embodiment, logistic tasks are carried out in a separate device from a main processor.

One or more computing devices may be included in a computing system. Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

A computing system may include, and/or may be implemented as, multiple functional modules or components, with each module or component including one or more resources (e.g., computing resources, storage resources, database resources, etc.). A system may include more or fewer components or modules, and a given module or component may be subdivided into two or more sub-modules or sub-components. Also, two or more of the modules or components can be combined.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A computing device, comprising:
one or more processors; and
one or more memory devices,
wherein the computing device comprises:
two or more physical mentor circuits, wherein each of at least two of the physical mentor circuits is assigned to a particular variable comprising a variable ID, a variable descriptor, and variable data, wherein the at least two of the physical mentor circuits are each configured to perform addressing calculations with respect to the particular variable to which it is assigned, wherein the at least two physical mentor circuits use one or more shared resources, and wherein the one or more shared resources comprise memory shared among the at least two physical mentor circuits, wherein at least two of the particular variables are associated with a variable namespace stored in one or more tables in at least one of the memory devices; and a civilware tier, wherein the civilware tier comprises a resource manager comprising one or more circuits, wherein the resource manager is configured to:

allocate virtual and physical memory space to variables assigned to each of at least two of the physical mentor circuits, wherein the variables comprise newly instantiated variables and variables that are converted from dormant state to active state;

allocate cache memory space to each of at least two of the physical mentor circuits that are assigned to the particular variables;

manage one or more logical mentors assigned to at least one of the one or more variables;

control operations of the physical mentor circuits such that each of at least two of the physical mentor circuits perform operations in parallel with one another with respect to their assigned respective one or more variables; and provide memory space protection to one or more active variables, wherein the memory space protection comprises bounds check protection for at least one of the one or more active variables.

2. The computing device of claim 1, wherein the civilware tier enforces one or more rules of behavior in the computing device as defined by the architecture of the computing device.

3. The computing device of claim 1, wherein the resource manager is at least partially programmable to manage one or more functions in the computing device.

4. The computing device of claim 1, wherein the computing device further comprises an instructions interpretation tier, wherein rules enforced by the civilware tier are independent of the specifics of the algorithms executed in the instruction interpretation tier.

5. The computing device of claim 1, wherein the civilware tier comprises a hermetically sealed portion, wherein hermetically sealing inhibits changes in the programming in the hermetically sealed portion of the civilware tier.

6. The computing device of claim 1, wherein the civilware tier is implemented through a combination of special logic hardware and an internal base microprocessor.

7. The computing device of claim 1, wherein the civilware tier is implemented, at least in part, through a combination of special logic hardware and processing assisted by a main processor.

8. The computing device of claim 1, further comprising one or more special logic hardware circuits, wherein the civilware tier is implemented at least in part through special logic hardware.

9. The computing device of claim 1, wherein the computing device includes two or more processors, wherein a first processor carries out algorithmic instructions execution of tasks of an instructions interpretation tier and a second processor carries out logistical and administrative tasks of the civilware tier.

10. The computing device of claim 1, wherein one processor of the computing device carries out algorithmic instructions execution and carries out logistical and administrative functions.

11. The computing device of claim 1, wherein the civilware tier is responsible for one or more functions of the resource management of virtual memory pages.

12. The computing device of claim 1, wherein the civilware tier is configured to enhance security by way of bounds checking, wherein bounds checking comprises performing, by at least one of physical mentor circuits assigned to a particular variable comprising a variable ID, a variable descriptor, and variable data, one or more bounds checks with respect to the particular variable to which the physical mentor circuit is assigned.

13. The computing device of claim 1, wherein parallel processing support by the civilware tier is given in terms of one or more functions associated with the ALL context for support of micro-parallelism (vector processing).

14. The computing device of claim 1, wherein parallel processing support by the civilware tier is in terms of one or more functions associated with the IMMUTABLE context for support of macro-parallelism and micro-parallelism (vector processing).

15. The computing device of claim 1, wherein the civilware tier comprises a virtual memory management algorithm that stores one or more variables on one or more mass storage devices such that variables are each stored in separate vessels.

16. The computing device of claim 1, wherein the civilware tier includes a virtual memory management algorithm that stores one or more variables in memory such that variables are each stored in separate vessels.

17. The computing device of claim 1, wherein the civilware tier is responsible for mapping one or more logical elements and requests to one or more physical resources.

18. The computing device of claim 1, wherein the one or more processors comprises two or more processors, wherein the computing device comprises a civilware tier associated with each of at least two of the processors, wherein the civilware tier associated with the at least two processors are responsible for two or more mentors controlling the same variable on different processors, wherein the mentors are responsible for the coordinated sharing of the variable's memory space.

19. The computing device of claim 1, wherein the physical mentors are implemented by a circuit that functions as multiple physical mentors as well as control of tactical tasks, wherein the tactical tasks comprise running application code compiled from high-level language application code or OS code.

20. The computing device of claim 1, wherein the civilware tier is configured to enhance security by way of matching one or more files requesting promotion to program status to an authorized program list.

21. A two control tier computing device, comprising:
one or more processors; and
one or more memory devices,
wherein the computing device further comprises an algorithmic instruction interpretation tier and a logistics civilware tier,
wherein the algorithmic instruction interpretation tier comprises one or more circuits that configured to perform tactical tasks comprising running application code compiled from high-level language application code, wherein the tactical tasks comprises tasks directly requested by the execution of application program algorithms,
wherein the logistics civilware tier comprises one or more circuits that deal with one or more logical elements and one or more physical resources, wherein the logistics civilware tier maps one or more logical operations into the one or more physical resources, wherein the civilware tier manages one or more physical devices independently from the instruction interpretation tier, wherein the civilware tier manages one or more physical mentor circuits, wherein each of at least two of the physical mentor circuits is assigned to a particular variable comprising a variable ID, a variable descriptor, and variable data, wherein each of at least two of the physical mentor circuits is configured to control ID space to logical space mapping or cache or both for the variable to which the physical mentor circuit is assigned, wherein the at least two of the physical mentor circuits are each configured to perform calculations with respect to the particular variable to which it is assigned, wherein the one or more processors comprise a base processor, wherein the base processor is configured to:
  manage variable descriptors for one or more variables associated with the physical mentor circuits;
  determine that at least one of the physical mentor circuits is to be replaced;
  reassign at least one of the physical mentor circuits to be replaced to another task; and
  promote a particular variable to which at least one of the physical mentor circuits is assigned from data status to program status, wherein the civilware tier is configured to perform one or more address mapping tasks and/or one or more cache management tasks and/or one or more security tasks, wherein at least some of the security tasks performed by the logistic civilware tier and at least some of the cache management are performed in parallel with at least some of the tactical tasks performed by the algorithmic instruction interpretation tier.

22. A computing device, comprising:
one or more memory devices;
one or more processors coupled to at least one of the memory devices; and
two or more physical mentor circuits, wherein each of at least two of the physical mentor circuits is assigned to a particular variable comprising a variable ID, a variable descriptor, and variable data, wherein the at least two of the physical mentor circuits are each configured to perform addressing calculations with respect to the particular variable to which it is assigned, wherein the at least two physical mentor circuits comprise one or more shared resources, and wherein the one or more shared resources use memory shared among the at least two physical mentor circuits,
wherein at least two of the particular variables are associated with a variable namespace stored in one or more tables in at least one of the memory devices; and
one or more civilware mechanisms, wherein at least one of the civilware mechanisms comprises one or more circuits configured to:
  allocate virtual and physical memory space to variables assigned to the physical mentor circuits, wherein the variables comprise newly instantiated variables and variables that are converted from dormant state to active state;
  provide memory space protection to one or more active variables, wherein the memory space protection comprises intrusion and data bounds protection for at least one of the one or more active variables;
  establish two or more virtual links between two or more programs using at least two of the variables to which the physical mentor circuits are assigned, and
  separate protocol processing from data transfer operations performed by the computing device.

23. A computing device comprising:
one or more processors;
one or more memory devices; and
two or more physical mentor circuits, wherein each of at least two of the physical mentor circuits is assigned to one or more particular variables comprising a variable ID, a variable descriptor and variable data, wherein the at least two of the physical mentor circuits are each configured to perform calculations with respect to the particular variable to which it is assigned, wherein the at least two physical mentor circuits comprise one or more shared resources, and wherein the one or more shared resources comprise memory shared among the at least two physical mentor circuits,
wherein the variables are associated with a variable namespace stored in one or more tables in at least one of the memory devices,
wherein the computing device comprises:
  an instructions interpretation tier, wherein the instructions interpretation tier comprises one or more circuits configured to perform tactical tasks comprising running application code compiled from high-level language application code; and
  a civilware tier configured to perform one or more functions of mapping of logical requirements to physical resources in the computing device, wherein the civilware tier comprises one or more circuits configured to:
    allocate virtual and physical memory space to variables assigned to the physical mentor circuits, wherein the variables comprise newly instantiated variables and variables that are converted from dormant state to active state;
    allocate cache memory space to each of at least two of the physical mentor circuits that are assigned to the particular variables;
    provide memory space protection to one or more active variables, wherein the memory space protection comprises bounds check protection for at least one of the one or more active variables; and
    manage one or more logical mentors assigned to at least one of the one or more variables, wherein managing at least one of the logical mentors comprises assigning at least one of the logical mentors to a physical mentor circuit.

* * * * *